Aug. 7, 1928.                                                  1,679,342
F. AESCHBACH
MACHINE FOR STIRRING AND BEATING DOUGH AND LIKE MATERIALS
Filed April 13, 1926
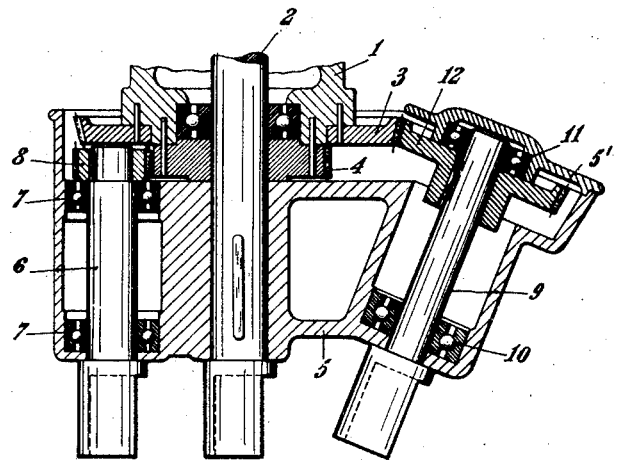
FRIEDRICH AESCHBACH
INVENTOR
By
his ATTORNEY.

Patented Aug. 7, 1928.

1,679,342

UNITED STATES PATENT OFFICE.

FRIEDRICH AESCHBACH, OF AARAU, SWITZERLAND, ASSIGNOR TO THE ARTOFEX CORPORATION, OF NEW YORK, N. Y.

MACHINE FOR STIRRING AND BEATING DOUGH AND LIKE MATERIALS.

Application filed April 13, 1926, Serial No. 101,619, and in Switzerland April 18, 1925.

This invention relates to machines for stirring and beating dough and like materials. In machines of this kind proposed heretofore it is customary to arrange the operative implement exchangeably on a shaft which lies at right angles or at an acute angle to a central shaft, and not only rotates about its own longitudinal axis, but also revolves bodily about the central shaft. These known devices are therefore adapted only for stirring or only for mixing or beating, but cannot be used for a plurality of implements.

This invention has for its object to provide an operative arm or holder which can be used both for stirring, beating and mixing.

According to the invention one bodily revolving operative shaft is arranged parallel to and a second bodily revolving operative shaft is arranged at an angle to a central shaft having a downwardly directed extension adapted for the attachment of a tool or implement.

With this improved device it is possible for example to work a mass of material with implements acting in a horizontal direction, and to admix in the same trough with the completely beaten mass an additional material, for example raisins, by means of an implement attached to the suitable shaft, which latter implement effects both in a horizontal and in a vertical direction the uniform distribution of the admixture through the entire mass; implements attached to vertical shafts work only in a horizontal direction and consequently do not effect perfect mixing. The described driving device thus obviates the necessity for using a separate mixing machine and enable all the operations requisite for preparing a mass of dough to be performed in the one machine.

One illustrative embodiment is diagrammatically represented by way of example in the accompanying drawing in vertical section.

A vertical hollow arm 1 that is fixed or is adjustable about a horizontal axis, has journaled in it by means of a ball-bearing a vertical central operative shaft 2. Concentrically with the shaft 2 the arm 1 carries a conical ring of teeth 3 constituting a bevel gear wheel and below the latter a fixed spur gear wheel 4. The central shaft 2 carries below the wheel 4 a hollow head 5 which is for the most part open at the top. An operative shaft or spindle 6 parallel with the shaft 2 is journaled in this head by means of two ball-bearings 7. Fast on the upper end of this spindle 6 is a planet wheel 8 meshing with the sun wheel 4. A slanting operating shaft or spindle 9 is also journaled in the head 5 by means of two ball-bearings 10 and 11, whereof the upper 11 is arranged in a cover 5' on the top of the head at the edge thereof. The spindle 9 is positively connected with the conical ring of teeth 3 by means of a planet bevel wheel 12 fast on the spindle 9.

The shafts 2, 6 and 9 are provided at their lower ends each with a head for receiving an implement, a stirrer being attached for example to the shaft 2, a mixing blade to the shaft 6 and a kneading arm to the shaft 9. When the shaft 2 rotates about its longitudinal axis the head 5, which is closed fluid-tight below, rotates with it and carries the spindles 6 and 9 bodily around the shaft 2. Owing to the planet wheels 12 and 8 rolling on the sun wheel 3 the spindles 9 and 6 rotate each about its own longitudinal axis at the same time. With a machine provided with the described multiple-spindle arm it is possible to stir, mix or knead material situated in one and the same trough, pan or the like.

I claim:—

1. In a device of the kind and for the purpose described, the combination of a rotatable central shaft, a head rotatable about the central shaft, a spindle for carrying an implement rotatably mounted in said head parallel with said shaft, and a second spindle for carrying an implement rotatably mounted in said head at an angle with said shaft, which shaft extends downwards beyond said head and is adapted to carry an implement, and means for rotating said spindles each about its longitudinal axis when revolving about the central shaft, substantially as described.

2. In a device of the kind and for the purpose described, the combination of a rotatable central shaft, a head fixed thereon above the lower end thereof, two sun wheels fixed in relation to said shaft above said head, a spindle that is rotatable in said head and is parallel with said shaft, a planet wheel fast on said spindle and meshing with one of said sun wheels, a second spindle that is rotatable in said head and makes an angle less than 180° with the longitudinal axis of said shaft, and a planet wheel fast on said second spindle and meshing with the other of said sun wheels, substantially as described.

In testimony whereof I affix my signature.

FRIEDRICH AESCHBACH.